(12) United States Patent
Yoshida et al.

(10) Patent No.: US 8,326,475 B2
(45) Date of Patent: Dec. 4, 2012

(54) HYBRID DRIVE DEVICE

(75) Inventors: Takashi Yoshida, Anjo (JP); Yomei Hakumura, Toyokawa (JP); Hideki Hisada, Okazaki (JP); Yoshinori Ono, Nukata-gun (JP)

(73) Assignee: Aisin AW Co., Ltd., Anjo (JP)

( * ) Notice: Subject to any disclaimer, the term of this patent is extended or adjusted under 35 U.S.C. 154(b) by 368 days.

(21) Appl. No.: 12/656,777

(22) Filed: Feb. 16, 2010

(65) Prior Publication Data
US 2010/0250037 A1 Sep. 30, 2010

(30) Foreign Application Priority Data

Mar. 31, 2009 (JP) .................. 2009-088217

(51) Int. Cl.
B60L 9/00 (2006.01)
B60L 11/00 (2006.01)
G05D 1/00 (2006.01)
G05D 3/00 (2006.01)
G06F 7/00 (2006.01)
G06F 17/00 (2006.01)

(52) U.S. Cl. ............... 701/22; 701/51; 701/54; 701/59; 701/66

(58) Field of Classification Search .............. 701/22, 701/51, 54, 59, 66
See application file for complete search history.

(56) References Cited

U.S. PATENT DOCUMENTS

| 6,081,042 | A | 6/2000 | Tabata et al. | |
| 7,770,676 | B2 | 8/2010 | Tenbrock et al. | |
| 2003/0033060 | A1* | 2/2003 | Okoshi | 701/22 |
| 2005/0159861 | A1* | 7/2005 | Iwatsuki et al. | 701/22 |
| 2006/0184304 | A1* | 8/2006 | Katou et al. | 701/54 |
| 2007/0246273 | A1 | 10/2007 | Tenbrock et al. | |
| 2007/0246275 | A1* | 10/2007 | Dreibholz et al. | 180/65.2 |
| 2010/0250037 | A1* | 9/2010 | Yoshida et al. | 701/22 |
| 2011/0295455 | A1* | 12/2011 | Schenk | 701/22 |

FOREIGN PATENT DOCUMENTS

| JP | A-09-257121 | 9/1997 |
| JP | A-11-094059 | 4/1999 |
| JP | A-2000-074202 | 3/2000 |
| JP | A 2007-320353 | 12/2007 |
| JP | A 2007-326556 | 12/2007 |
| JP | A-2007-326557 | 12/2007 |

OTHER PUBLICATIONS

International Search Report mailed Mar. 30, 2010 for PCT/JP2010/052524.

May 17, 2012 Office Action issued in Japanese application No. 2009-088217 (English Translation only).

* cited by examiner

Primary Examiner — Prasad Gokhale
(74) Attorney, Agent, or Firm — Oliff & Berridge, PLC

(57) ABSTRACT

A hybrid drive device includes a transfer torque estimation unit for estimating a transfer torque transferred by the lock-up clutch with the lock-up clutch slipping; and a target rotational speed determination unit for determining the target rotational speed of the rotary electric machine to be achieved in the rotational speed control on the basis of the transfer torque estimated by the transfer torque estimation unit, a target transmission device input torque of the transmission device determined on the basis of an operating state of a vehicle, and a turbine speed of the turbine runner, wherein the engine startup control device starts up the engine by controlling the rotational speed of the rotary electric machine to the target rotational speed determined by the target rotational speed determination unit.

11 Claims, 11 Drawing Sheets

F I G . 4
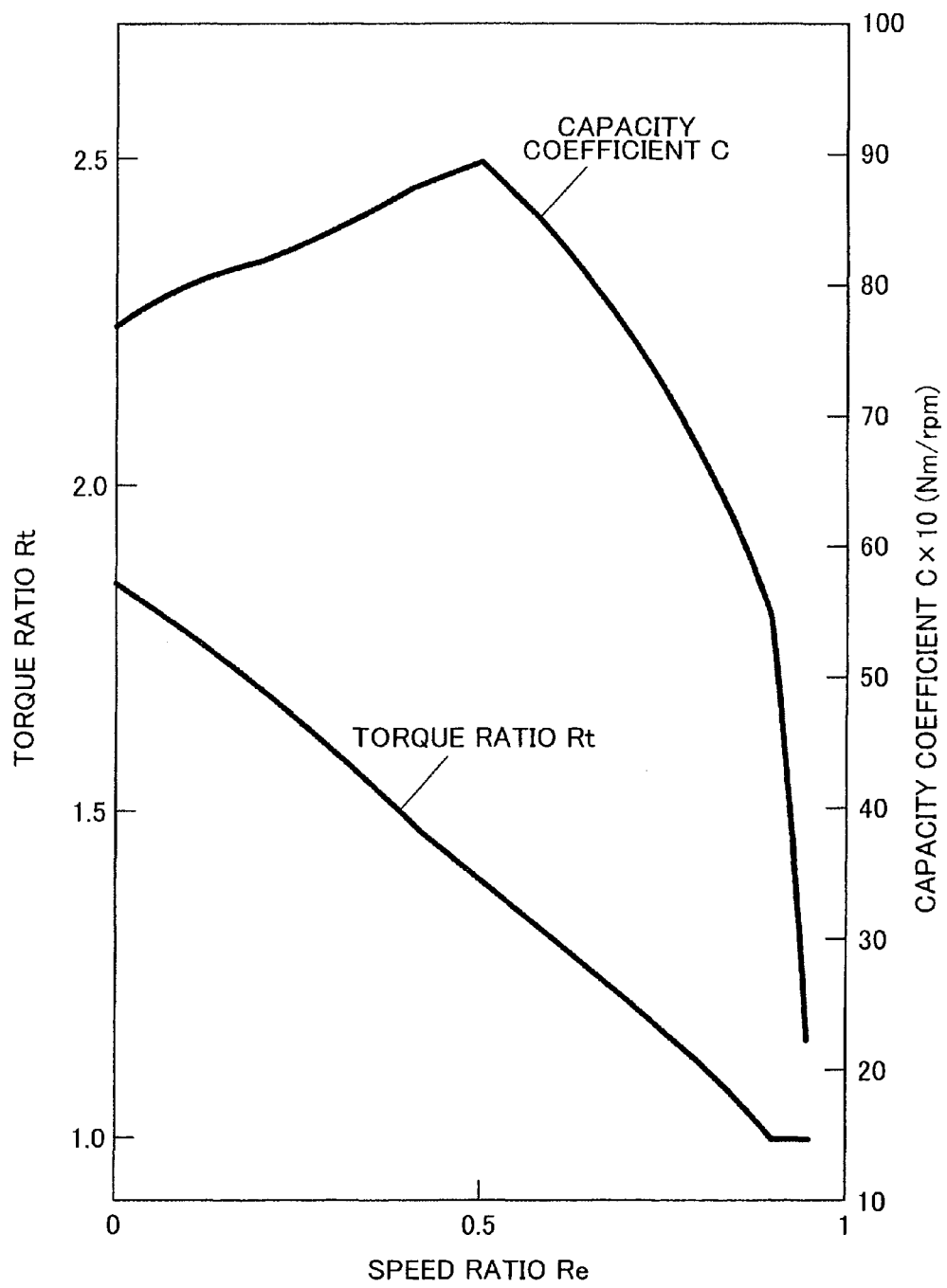

F I G . 10
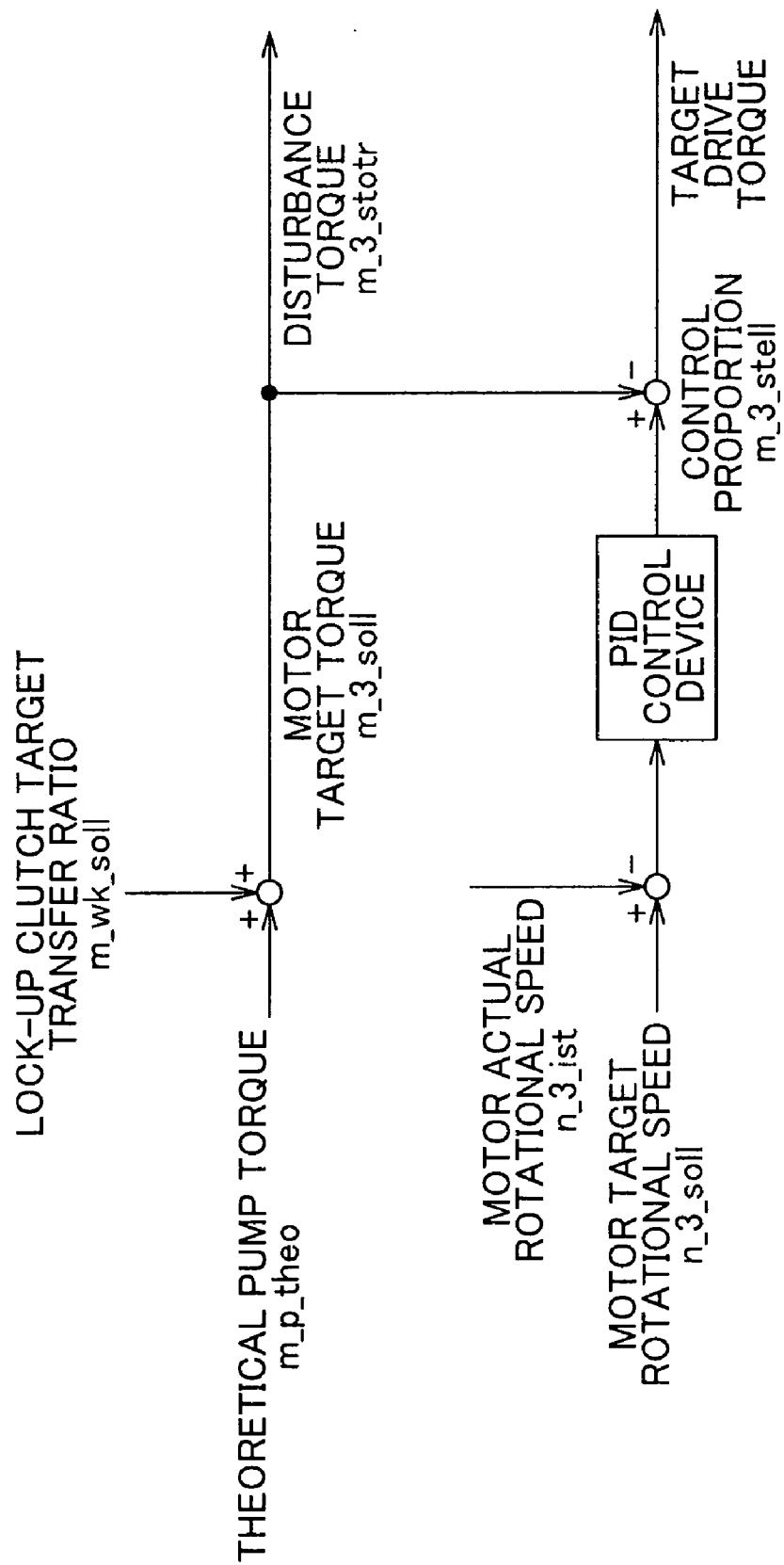

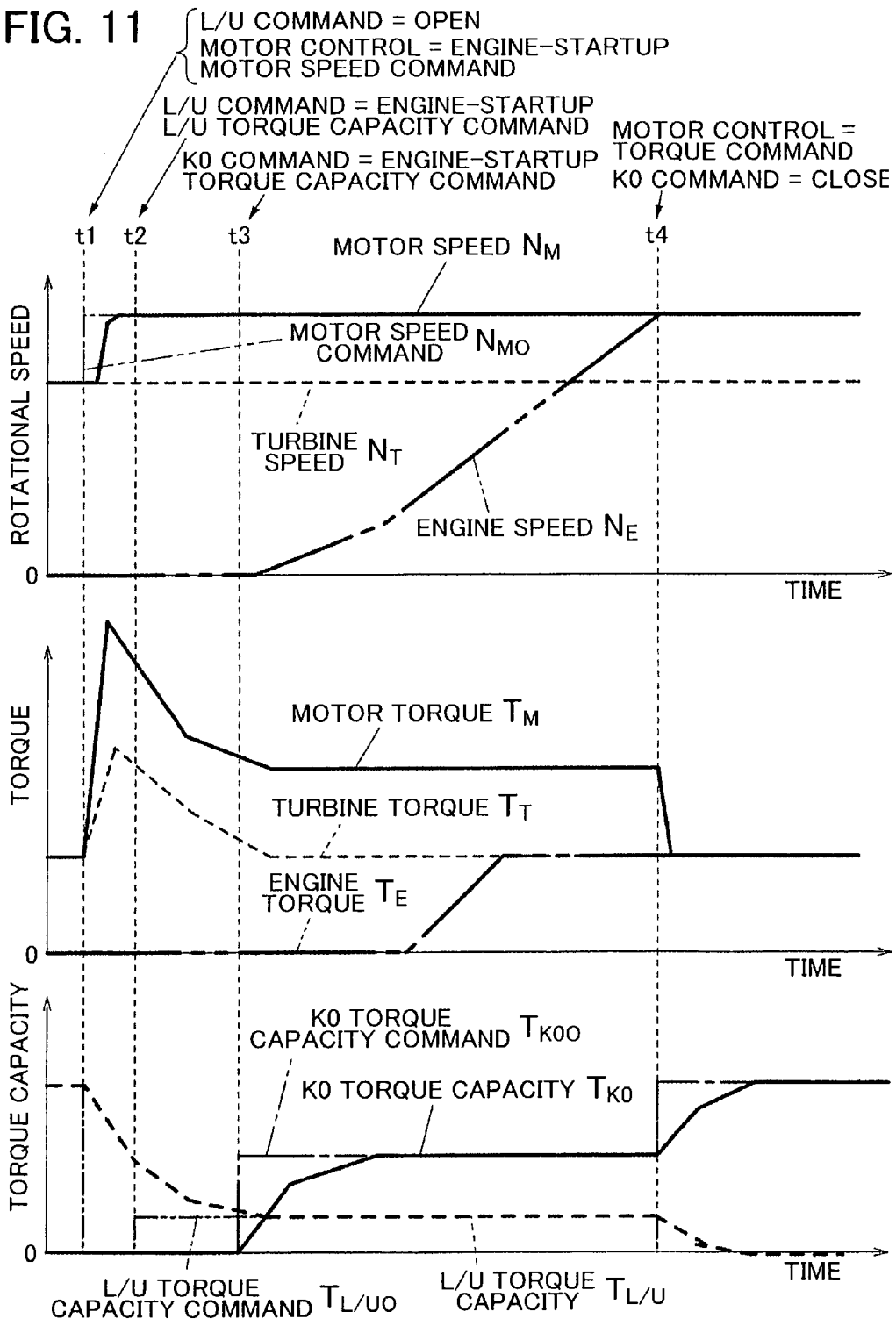

HYBRID DRIVE DEVICE

INCORPORATION BY REFERENCE

The disclosure of Japanese Patent Application No. 2009-088217 filed on Mar. 31, 2009, including the specification, drawings and abstract is incorporated herein by reference in its entirety.

BACKGROUND

The present invention relates to a parallel hybrid drive device that starts up an engine using a rotary, electric machine.

A so-called parallel hybrid drive device, which is well known in the art, includes a rotary electric machine coupled to an engine via a transfer clutch, a fluid power transmission device including a lock-up clutch and having a pump impeller and a turbine runner, and a transmission device coupled to the rotary electric machine via the fluid power transmission device to receive a driving force produced by one or both of the engine and the rotary electric machine each serving as a driving force source and to output the received driving force after changing the speed thereof.

In the parallel hybrid drive device, the engine is started from a so-called EV running state in which only a driving force produced by the rotary electric machine is output to run the vehicle, by transferring a part of the driving force produced by the rotary electric machine to the engine.

Such engine startup is performed, from a state in which a driving force is transferred from the rotary electric machine to the transmission device with the engine stationary, by executing rotational speed control in which the rotational speed of the rotary electric machine is brought to a target rotational speed with the lock-up clutch slipping, and engaging the transfer clutch. The rotational speed is synonymous with the number of revolutions.

Japanese Patent Application Publication No. JP-A-2007-326557 describes one form of such engine startup.

According to the technique described in Japanese Patent Application Publication No. JP-A-2007-326557, a lock-up clutch is allowed to slip at engine startup to control the rotational speed of a rotary electric machine such that a torque converter produces a certain rotational speed difference, and the torque capacity of the lock-up clutch is computed on the basis of a theoretical turbine torque calculated from the certain rotational speed difference and a target output torque, reducing a torque shock at engine startup.

SUMMARY

Normally, however, while the responsiveness of a rotary electric machine is very high, the responsiveness of a lock-up clutch is low. For example, the responsiveness of a lock-up clutch is about several tens of times lower than the responsiveness of a rotary electric machine. Thus, in the case where a target rotational speed of the rotary electric machine is determined and a lock-up capacity command corresponding to the target rotational speed is determined to control both the rotary electric machine and the lock-up clutch, the target rotational speed of the rotary electric machine is determined without consideration of the response of the lock-up clutch, and therefore an error corresponding to a control response delay of the lock-up clutch occurs in torque to be transferred to the transmission device. Also, a torque capacity error due to variations in characteristics and secular changes of the lock-up clutch causes an error in target output torque.

In the case where the torque capacity is increased, the target output torque becomes short. Conversely, in the case where the torque capacity is reduced, the target output torque becomes excessive.

The technique disclosed in Japanese Patent Application Publication No. JP-A-2007-326557 will be described in further detail.

In engine startup control according to the present application, a rotary electric machine serves as a motor. Therefore, a rotary electric machine is hereinafter occasionally referred to as a motor.

FIG. 10 is a functional block diagram for engine startup control according to the technique disclosed in Japanese Patent Application Publication No. JP-A-2007-326557.

As is clear from FIG. 10, a motor torque at engine startup is obtained by adding a torque calculated through rotational speed control using PID control performed on a target rotational speed of a motor calculated as the sum of an actual turbine speed and a certain rotational speed minimum difference, and a torque calculated as the sum of a target transfer capacity of a lock-up clutch and a theoretical pump torque.

The target transfer capacity of the lock-up clutch is calculated from a theoretical turbine torque, which is calculated from the actual turbine speed and the target driving speed of the motor, and a target transmission device input torque. Normally, the theoretical turbine torque is calculated by the equation as follows: theoretical turbine torque=capacity coefficient×pump speed×pump speed×torque ratio. That is, according to the technique disclosed in Japanese Patent Application Publication No. JP-A-2007-326557, the theoretical turbine torque is calculated on the basis of a converter characteristics map (normally, a map of the capacity coefficient and the torque ratio) of a functional block 7 and the pump speed (the sum of the actual turbine speed and the rotational speed minimum difference).

However, the control responsiveness of the lock-up clutch is normally poor, and therefore the pump speed rises with a delay when the lock-up clutch is controlled with slipping. Therefore, if the target rotational speed of the motor is determined without consideration of the control response delay of the lock-up clutch, a greater amount of torque than the target is transferred to the transmission device via the lock-up clutch, and therefore the torque transferred to the transmission device cannot be controlled as targeted.

FIG. 11 shows the behavior of each of the motor, the turbine, the engine, and a K0 clutch serving as the transfer clutch in the case where the engine startup control disclosed in Japanese Patent Application Publication No. JP-A-2007-326557 is executed. In the drawing, rotational speeds (motor speed $N_M$, motor speed command $N_{MO}$, turbine speed $N_T$, and engine speed $N_E$) are shown in the upper part, torques (motor torque $T_M$, turbine torque $T_T$, and engine torque $T_E$) are shown in the middle part, and torque capacity commands (K0 clutch torque capacity command $T_{K0O}$ and lock-up clutch capacity command $T_{L/UO}$) and actual torque capacities (K0 torque capacity $T_{K0}$ as the actual torque capacity of the K0 clutch and L/U torque capacity $T_{L/U}$ as the actual torque capacity of the lock-up clutch) are shown in the lower part. In the present application, a command occasionally also refers to a command value.

In the drawing, timings indicated by t1 to t4 respectively indicate a timing t1 to open the lock-up control command and start motor speed control, a timing t2 to start lock-up control, a timing t3 to start K0 clutch engagement control, and a timing t4 to start motor torque control and stop K0 clutch control.

As is clear from the drawing, a large peak appears in each of the motor torque $T_M$ and the turbine torque $T_T$ to cause a shock at a certain time after the timing t to open the lock-up control command.

It is an object of the present invention to provide a hybrid drive device that allows an engine to be started by a driving force of a rotary electric machine in an EV running state and that allows a torque that exactly matches a target torque to be transferred to a transmission device, and to provide a hybrid drive device that allows such control to be performed.

In order to achieve the foregoing object, a hybrid drive device according to the present invention includes: a rotary electric machine coupled to an engine via a transfer clutch; a fluid power transmission device including a lock-up clutch and having a pump impeller and a turbine runner; a transmission device coupled to the rotary electric machine via the fluid power transmission device to receive a driving force produced by one or both of the engine and the rotary electric machine each serving as a driving force source and to output the received driving force after changing a speed thereof; and an engine startup control device that starts up the engine, from a state in which the driving force is transferred from the rotary electric machine to the transmission device with the engine stationary and with the lock-up clutch engaged, by executing rotational speed control to bring a rotational speed of the rotary electric machine to a target rotational speed with the lock-up clutch slipping, and engaging the transfer clutch. The hybrid drive device is characterized by including: a transfer torque estimation unit for estimating a transfer torque transferred by the lock-up clutch with the lock-up clutch slipping; and a target rotational speed determination unit for determining the target rotational speed of the rotary electric machine to be achieved in the rotational speed control on the basis of the transfer torque estimated by the transfer torque estimation unit, target transmission device input torque of the transmission device determined on the basis of an operating state of a vehicle, and a turbine speed of the turbine runner. In the hybrid drive device, the engine startup control device starts up the engine by controlling the rotational speed of the rotary electric machine to the target rotational speed determined by the target rotational speed determination unit.

In the engine startup control performed by the hybrid drive device, the engine is started from a state in which a driving force is transferred from the rotary electric machine to the transmission device with the engine stationary and with the lock-up clutch engaged, by executing rotational speed control to bring a rotational speed of the rotary electric machine to a target rotational speed with the lock-up clutch slipping, and engaging the transfer clutch. The transfer torque estimation unit estimates a transfer torque transferred by the lock-up clutch with the lock-up clutch slipping. The target rotational speed determination unit determines the target rotational speed of the rotary electric machine to be achieved in the rotational speed control on the basis of the transfer torque estimated by the transfer torque estimation unit, a target transmission device input torque of the transmission device determined on the basis of an operating state of a vehicle, and a turbine speed of the turbine runner. The engine startup control device controls the rotational speed of the rotary electric machine to the target rotational speed determined by the target rotational speed determination unit.

According to the configuration, the rotational speed of the rotary electric machine can be controlled to the target rotational speed of the rotary electric machine determined in consideration of the torque actually transferred by the lock-up clutch. Thus, the input torque of the transmission device can be controlled to the target transfer torque determined in consideration of a delay in disengagement of the lock-up clutch.

In the above configuration, it is preferable that the transfer torque estimation unit include a transfer torque prediction unit including a control delay element for outputting a predicted transfer torque with a control response delay with respect to a target transfer torque command provided to the lock-up clutch, and estimate the transfer torque on the basis of the predicted transfer torque output from the transfer torque prediction unit.

According to the thus configured hybrid drive device, the transfer torque prediction unit can provide a predicted transfer torque with a control response delay with respect to a target transfer torque command, accommodating an error corresponding to a control response delay of the lock-up clutch.

This type of transfer torque prediction unit may be an element provided with a so-called transfer function representing the transfer characteristics of the lock-up clutch.

In the above configuration, it is preferable that the transfer torque estimation unit estimate the transfer torque on the basis of a predicted transfer torque which is a response with a control response delay to a target transfer torque command provided to the lock-up clutch, and an estimated actual transfer torque estimated to be actually transferred by the lock-up clutch.

With this configuration, an error corresponding to a control response delay of the lock-up clutch, which may be problematic in transfer torque estimation, can be accommodated by estimating the transfer torque with reference to the estimated actual transfer torque and the predicted transfer torque.

Further, it is possible to allow adaptation to individual lock-up clutches and to eliminate a torque error due to variations of the lock-up clutches by estimating the transfer torque on the basis of the estimated actual transfer torque and the predicted transfer torque.

In the above configuration, it is preferable that the transfer torque estimation unit include an actual transfer torque estimation unit for calculating a capacity coefficient C of the fluid power transmission device on the basis of a speed ratio Re which is a ratio $N_T/N_P$ between the turbine speed $N_T$ of the turbine runner of the fluid power transmission device and a pump speed $N_P$, and computing the estimated actual transfer torque on the basis of a rotary electric machine torque command $T_{MO}$ for the rotary electric machine, the rotational speed $N_M$ of the rotary electric machine, the capacity coefficient C, and an inertia $J_M$ of the rotary electric machine. It is also preferable that the transfer torque estimation unit estimate the transfer torque to be the estimated actual transfer torque computed by the actual transfer torque estimation unit on the basis of the rotary electric machine torque command $T_{MO}$, the actual rotational speed $N_M$ of the rotary electric machine, the capacity coefficient C, and the inertia $J_M$ of the rotary electric machine.

With this configuration, it is possible to obtain an estimated actual transfer torque at each timing during execution of engine startup control, to determine the target rotational speed of the rotary electric machine on the basis of the obtained transfer torque, and to provide the transmission device with a torque that matches the target torque well.

More specifically, the actual transfer torque estimation unit may compute the estimated actual transfer torque $T_{L/UR}$ on the basis of the rotary electric machine torque command $T_{MO}$ for the rotary electric machine, the actual rotational speed $N_M$ of the rotary electric machine, a time differential $N_{MD}$ of the actual rotational speed of the rotary electric machine, the capacity coefficient C, and the inertia $J_M$ of the rotary electric machine using a formula $T_{L/U R} = T_{MO} - N_M^2 \times C - J_M \times N_{MD}$.

In the above configuration, it is preferable that the transfer torque estimation unit include: a transfer torque prediction unit including a control delay element for outputting a predicted transfer torque with a control response delay with respect to a target transfer torque command provided to the lock-up clutch; and an actual transfer torque estimation unit for calculating a capacity coefficient C of the fluid power transmission device on the basis of a speed ratio Re which is a ratio $N_T/N_P$ between the turbine speed $N_T$ of the turbine runner of the fluid power transmission device and a pump speed $N_P$, and computing the estimated actual transfer torque on the basis of a rotary electric machine torque command $T_{MO}$ for the rotary electric machine, the rotational speed $N_M$ of the rotary electric machine, the capacity coefficient C, and an inertia $J_M$ of the rotary electric machine. It is also preferable that the transfer torque estimation unit estimate the transfer torque on the basis of the predicted transfer torque output from the transfer torque prediction unit in response to an actual target transfer torque command, and the estimated actual transfer torque computed by the actual transfer torque estimation unit on the basis of an actual rotary electric machine torque command $T_{MO}$, the actual rotational speed $N_M$ of the rotary electric machine, the capacity coefficient C, and an inertia $J_M$ of the rotary electric machine.

With this configuration, an error corresponding to a control response delay of the lock-up clutch, which may be problematic in transfer torque estimation, can be accommodated by estimating the transfer torque with reference to the estimated actual transfer torque obtained by the actual transfer torque estimation unit and the predicted transfer torque obtained by the transfer torque prediction unit.

Further, it is possible to allow adaptation to individual lock-up clutches and to eliminate a torque error due to variations of the lock-up clutches by estimating the transfer torque on the basis of the estimated actual transfer torque and the predicted transfer torque.

It is preferable that, the hybrid drive device further include: a transfer torque error derivation unit for calculating a transfer torque error which is a difference between the estimated actual transfer torque and the predicted transfer torque; and a transfer torque estimation learning unit for allowing the transfer torque error derived by the transfer torque error derivation unit to be reflected in transfer torque estimation subsequently performed by the transfer torque estimation unit.

With the transfer torque error derivation unit and the transfer torque estimation learning unit provided, it is possible to enhance the convergence and the precision of the control by allowing the transfer torque error to be reflected in transfer torque estimation subsequently performed by the transfer torque estimation unit.

It is preferable that the hybrid drive device further include: a capacity coefficient derivation unit for calculating a capacity coefficient of the fluid power transmission device on the basis of relationship between an output torque and the rotational speed of the rotary electric machine in an EV running state in which a driving force produced by the rotary electric machine is transferred to the transmission device via the fluid power transmission device with both the transfer clutch and the lock-up clutch disengaged; and a capacity coefficient learning unit for allowing the capacity coefficient calculated by the capacity coefficient derivation unit to be reflected in transfer torque estimation subsequently performed by the transfer torque estimation unit.

With the capacity coefficient derivation unit and the capacity coefficient learning unit provided, it is possible to learn the capacity coefficient, which is one of the characteristics of the fluid power transmission device used in calculation of the transfer torque of the lock-up clutch, and to enhance the precision of estimation of the transfer torque of the lock-up clutch.

BRIEF DESCRIPTION OF THE DRAWINGS

FIG. 4 shows the relationship of the capacity coefficient C and the torque ratio t with respect to the speed ratio Re;

FIG. 10 is a functional block diagram of an engine startup control device according to the related art; and FIG. 11 is a time chart corresponding to a flow of engine startup control shown in FIG. 10.

DETAILED DESCRIPTION OF EMBODIMENTS

An embodiment of the present invention will be described with reference to the drawings.

A hybrid drive device 2 according to the embodiment includes an engine startup control unit 3 serving as an engine startup control device 1.

Figure 1:
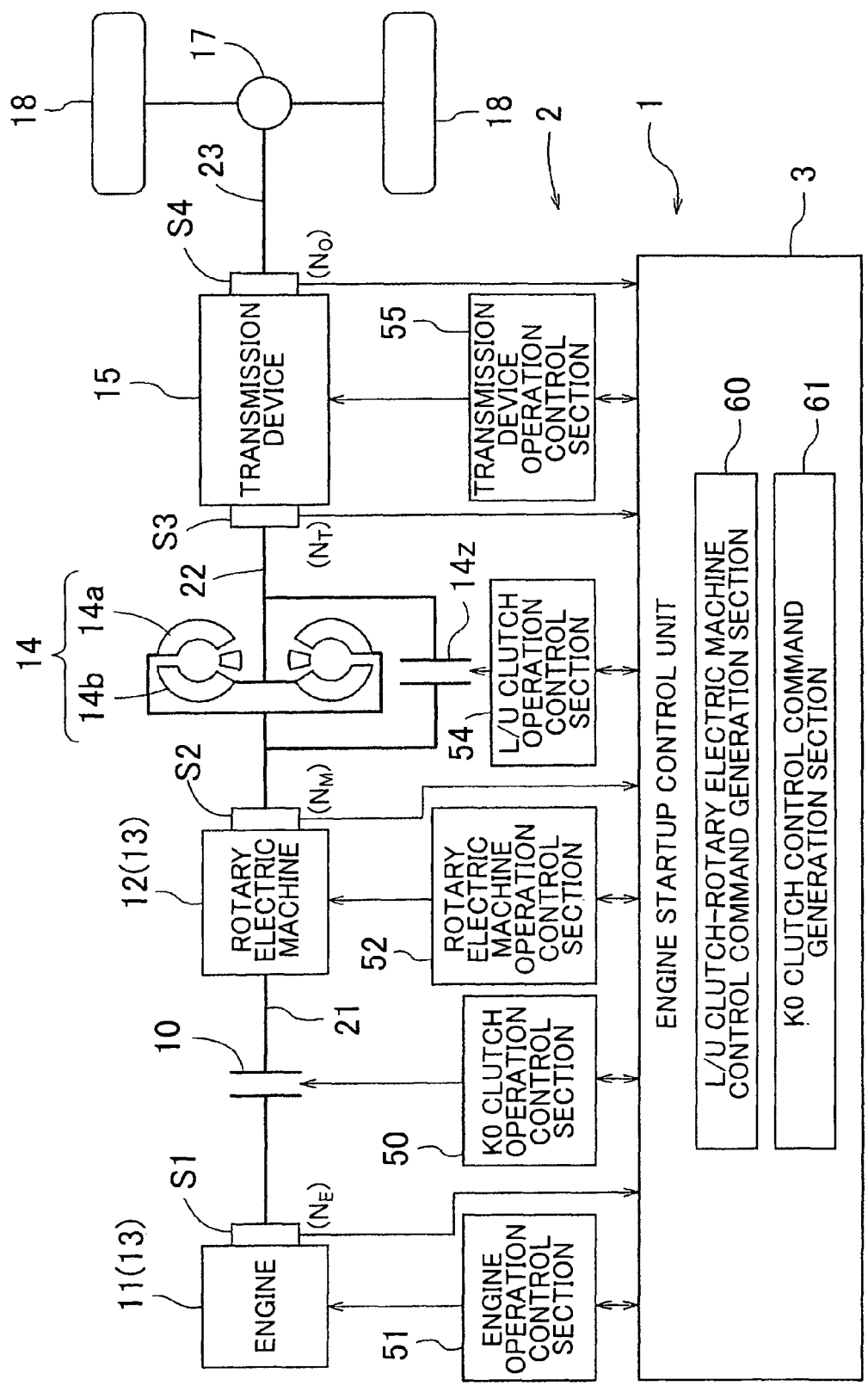
FIG. 1 shows a schematic configuration of a hybrid drive device including an engine startup control device according to the present application.

FIG. 1 is a schematic diagram showing the configuration of a drive/transmission system and a signal system of the hybrid drive device 2 according to the embodiment. In the drawing, thick solid lines each indicate a driving force transfer path, and thin solid lines each indicate a signal transfer path. As shown in the drawing, the hybrid drive device 2 generally includes an engine 11 and a rotary electric machine 12 each serving as a driving force source 13. Driving forces of the driving force sources 13 are transferred to wheels 18 via a torque converter 14 and a transmission device 15. The hybrid drive device 2 also includes a hydraulic pressure control device (not shown) that supplies hydraulic oil to respective portions such as the torque converter 14 and the transmission device 15.

Figure 2:
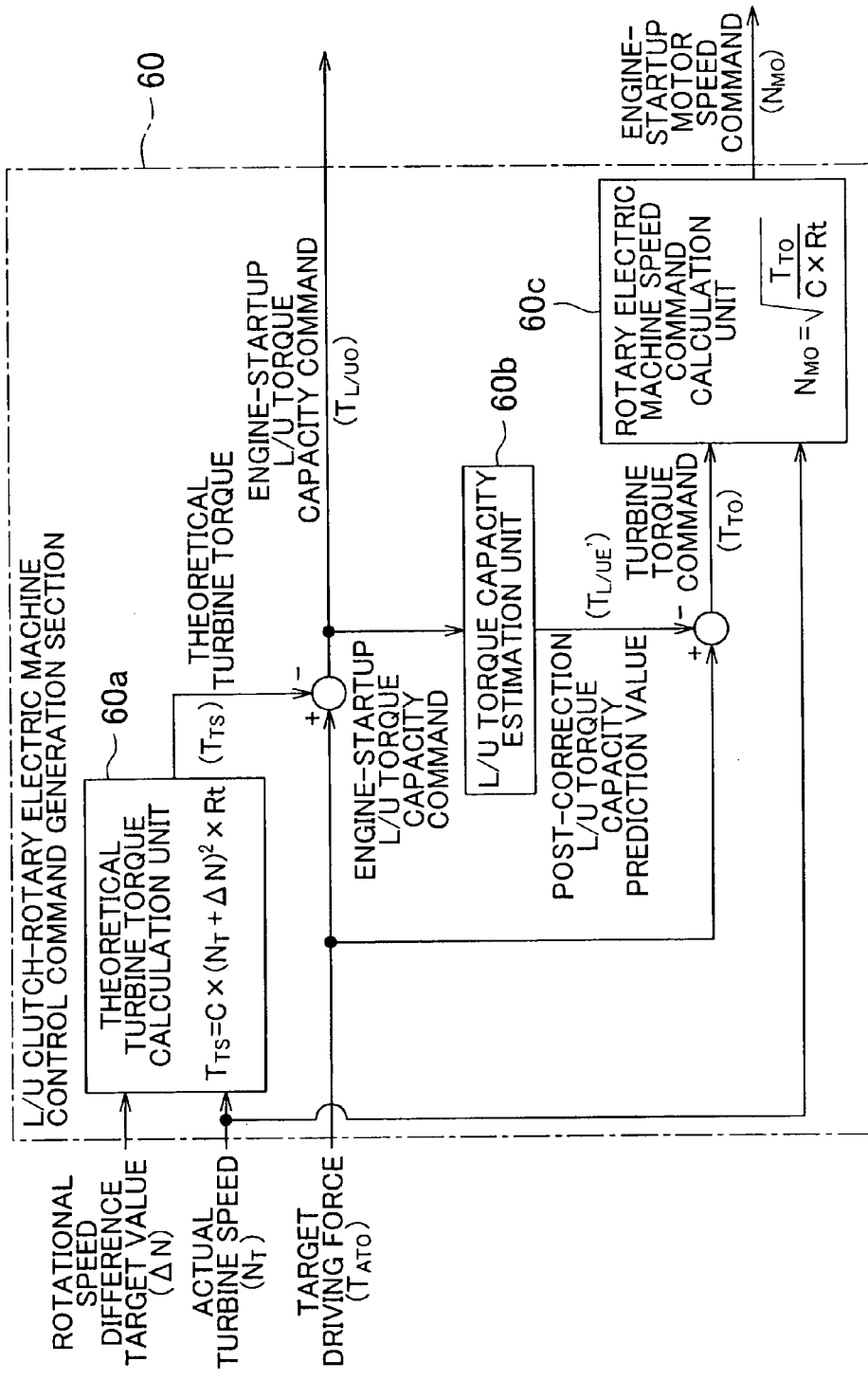
FIG. 2 is a functional block diagram of an L/U clutch-rotary electric machine control command generation section of the engine startup control device according to the present application.
Figure 3:
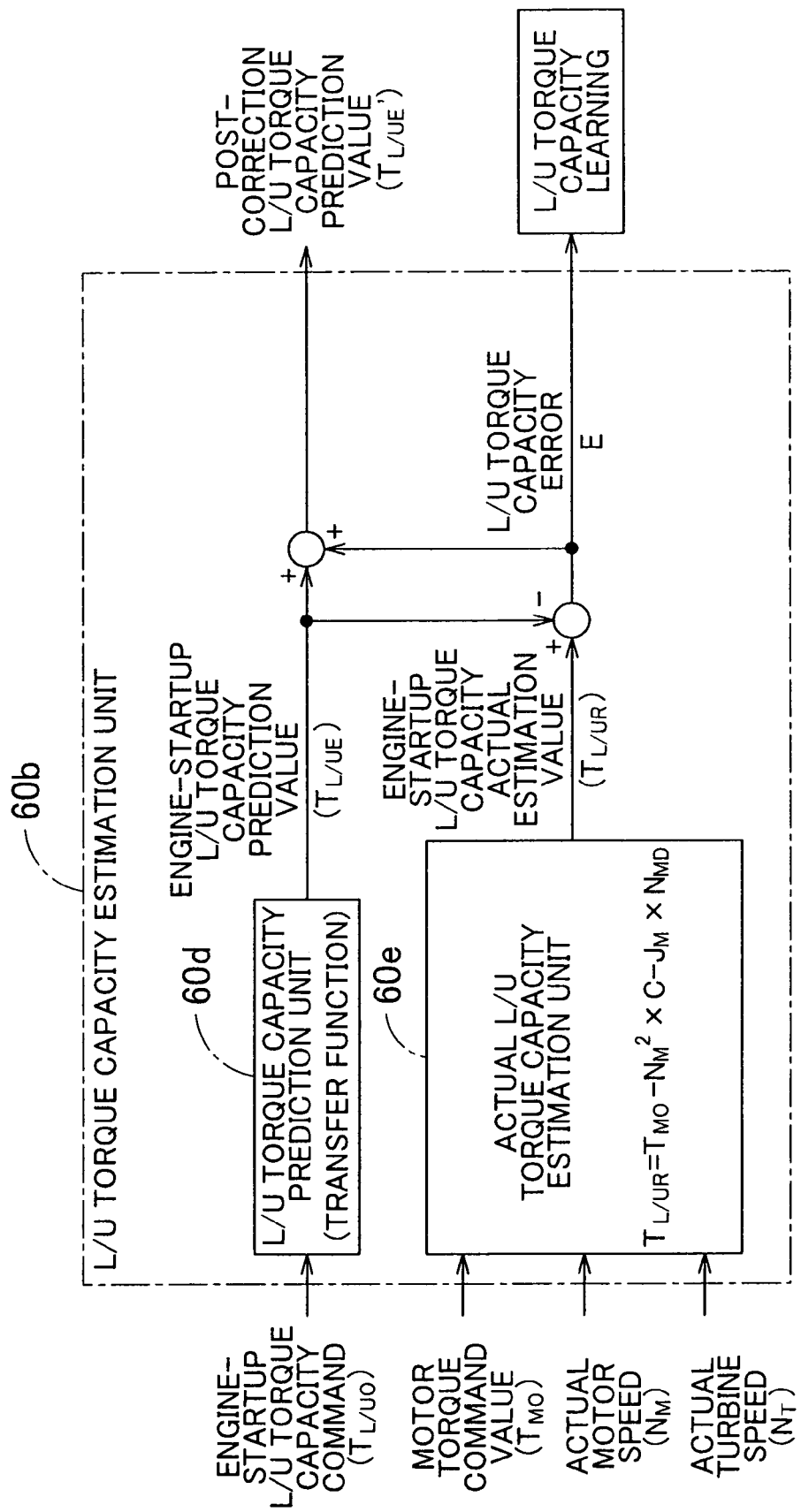
FIG. 3 is a functional block diagram of an L/U torque capacity estimation unit of the engine startup control device according to the present application.

FIG. 2 is a functional block diagram showing the configuration of an L/U clutch-rotary electric machine control command generation section 60 of the engine startup control device 1 shown in FIG. 1. FIG. 3 is a functional block diagram showing the configuration of the L/U torque capacity estimation unit 60b of the engine startup control unit 3 shown in FIG. 2.

1. Configuration of Drive/Transmission System of Hybrid Drive Device

The configuration of the drive/transmission system of the hybrid drive device 2 will be described.

As shown in FIG. 1, the hybrid drive device 2 is a drive device for a hybrid vehicle of a parallel type, which includes an engine 11 and a rotary electric machine 12 each serving as a driving force source 13 and coupled in series via a K0 clutch 10 serving as a transfer clutch.

An engine operation control section 51 is provided to control operation of the engine 11. A K0 clutch operation control section 50 is provided to control operation of the K0 clutch 10. A rotary electric machine operation control section 52 is provided to control operation of the rotary electric machine 12. An L/U clutch operation control section 54 is provided to control operation of a lock-up clutch 14z. A transmission device operation control section 55 is provided to control operation of the transmission device 15.

The engine operation control section 51 controls the rotational speed and the output torque of the engine in accordance with the running state of the vehicle. The K0 clutch operation control section 50 controls the hydraulic pressure to be supplied to the K0 clutch 10 in accordance with a K0 torque capacity command. The rotary electric machine operation control section 52 controls the rotational speed and the output torque of the rotary electric machine 12 in accordance with a rotary electric machine speed command and a rotary electric machine torque command, respectively. The L/U clutch operation control section 54 controls the hydraulic pressure to be supplied to the L/U clutch 14z in accordance with an L/U torque capacity command. The L/U clutch operation control section 54 includes a valve that controls engagement and disengagement operation of the lock-up clutch 14z. By driving the valve, hydraulic oil is supplied to an oil chamber of the lock-up clutch 14z to control engagement and disengagement operation of the lock-up clutch 14z. The torque transferred by the lock-up clutch 14z is referred to as a transfer torque capacity. The transmission device operation control section 55 operates engagement states of frictional engagement elements provided at various portions of the transmission device 15 in accordance with the running state of the vehicle.

The engine 11 is an internal combustion engine driven by combustion of fuel. Various engines known in the art such as gasoline engines and diesel engines, for example, may be used as the engine 11. The rotary electric machine 12 is operable as a motor (rotary machine) that is supplied with electric power to produce motive power and as a generator (electric generator) that is supplied with motive power to produce electric power. Therefore, the rotary electric machine 12 is electrically connected to a battery (not shown) serving as an electricity accumulation device. That is, the rotary electric machine 12 receives electric power from the battery for power running, or is driven by a rotational driving force transferred from the wheels to generate electric power and to accumulate the generated electric power in the battery. The electricity accumulation device may be suitably implemented by a capacitor or a combination of a battery and a capacitor. A rotor of the rotary electric machine 12 is coupled to an input shaft 21 so as to rotate together with the input shaft 21. A K0 clutch 10 is provided between the engine 11 and the rotary electric machine 12 to selectively couple the engine 11 to the input shaft 21. That is, the input shaft 21 is selectively coupled to the engine 11 via the K0 clutch 10. The K0 clutch 10 is supplied with hydraulic oil to operate under control by a hydraulic pressure control valve serving as the K0 clutch operation control section 50. In the embodiment, the input shaft 21 corresponds to the input member of the present invention.

In the hybrid drive device 2, when the vehicle is starting to move or running at a low speed, only the rotational driving force of the rotary electric machine 12 transferred to the wheels 18 to drive the vehicle with the K0 clutch 10 disengaged and with the engine 11 stationary. At this time, the rotary electric machine 12 receives electric power from the battery to produce a driving force. When the rotational speed of the rotary electric machine 12 is a certain speed or higher, the K0 clutch 10 is engaged to crank the engine 11 for startup. After the engine 11 is started, the hybrid drive device 2 transfers the rotational driving force of both the engine 11 and the rotary electric machine 12 to the wheels 18 to drive the vehicle.

At this time, the rotary electric machine 12 may be driven by the rotational driving force of the engine 11 to generate electric power, or receive electric power from the battery to produce a driving force, depending on the charge state of the battery. When the vehicle is decelerating, the rotary electric machine 12 is driven by the rotational driving force transferred from the wheels 18 to generate electric power with the K0 clutch 10 disengaged and with the engine 11 stationary. The electric power generated by the rotary electric machine 12 is accumulated in the battery. When the vehicle is stationary, the engine 11 and the rotary electric machine 12 are stationary with the K0 clutch 10 disengaged.

The hybrid drive device 2 includes a transmission device 15 that transfers a rotational driving force of an intermediate shaft 22, of which an upstream end along the power transmission path is drivably coupled to the driving force source 13, to an output shaft 23, and a torque converter 14 provided between the input shaft 21 and the transmission device 15. The transmission device 15 is a device that transfers the rotational driving force from the driving force source 13, which is transmitted via the torque converter 14, to the output shaft 23 on the side of the wheels 18 after changing the speed of the rotational driving force. The torque converter 14 is a device that transmits the rotational driving force of the input shaft 21, which is drivably coupled to the driving force source 13, to the transmission device 15 via the intermediate shaft 22.

The torque converter 14 includes a pump impeller 14a serving as an input-side rotary member and coupled to the input shaft 21, a turbine runner 14b serving as an output-side rotary member and coupled to the intermediate shaft 22, and so forth. The torque converter 14 transfers a driving force between the pump impeller 14a on the driving side and the turbine runner 14b on the driven side via hydraulic oil filling the torque converter 14. The torque converter 14 also includes a lock-up clutch 14z serving as a frictional engagement element for lock-up. The lock-up clutch 14z is a clutch that couples the pump impeller 14a and the turbine runner 14b to rotate together at a transfer efficiency enhanced by eliminating the difference in rotational speed (slipping) between the pump impeller 14a and the turbine runner 14b. Slipping between the pump impeller 14a and the turbine runner 14b in the lock-up clutch 14z is detectable by monitoring the difference in rotational speed between the pump impeller 14a and the turbine runner 14b.

When the lock-up clutch 14z is engaged, the torque converter 14 directly transfers the driving force of the driving force source 13 (the input shaft 21) to the transmission device 15 (the intermediate shaft 22) not via hydraulic oil. The torque converter 14 which includes the lock-up clutch 14z is supplied with hydraulic oil.

The transmission device 15 is a stepped automatic transmission having a plurality of shift speeds. In order to provide a plurality of shift speeds with different speed change ratios, the transmission device 15 includes a gear mechanism (not shown) such as a planetary gear mechanism, and a plurality of frictional engagement elements, such as clutches and brakes, that engage and disengage rotary elements of the gear mechanism to change shift speeds. The transmission device 15 transfers converted torque to the output shaft 23 while changing the rotational speed of the intermediate shaft 22 with a predetermined speed change ratio set to each shift speed. The rotational driving force transferred from the transmission device 15 to the output shaft 23 is transferred to the wheels 18 via a differential device 17.

2. Configuration of Detection System of Hybrid Drive Device

As shown in FIG. 1, an engine speed sensor S1 is provided to detect the rotational speed of the engine 11. A rotary electric machine speed sensor S2 is provided to detect the rotational speed of the rotary electric machine 12. A transmission device input speed sensor S3 and a transmission device output speed sensor S4 are provided to detect the rotational speeds on the input side and the output side, respectively, of the transmission device 15. The detection results of the rotational speed sensors S1, S2, S3, and S4 are sent to the engine startup control unit 3.

The difference between the rotary electric machine speed and the transmission device input rotational speed detected is the slipping (difference in rotational speed) of the lock-up clutch 14z described earlier.

3. Configuration of Engine Startup Control Unit

The configuration of the engine startup control unit 3 will be described below with reference to FIGS. 1 to 3. As shown in FIG. 1, the engine startup control unit 3 includes as its main functional units an L/U clutch-rotary electric machine control command generation section 60 and a K0 clutch control command generation section 61.

The L/U clutch-rotary electric machine control command generation section 60 generates a command to be sent to the rotary electric machine operation control section 52 and the L/U clutch operation control section 54 on the basis of the detection results of the speed sensors S1, S2, S3, and S4 in engine startup control, and outputs the generated command.

The K0 clutch control command generation section 61 generates a command to be sent to the K0 clutch operation control section 50 on the basis of the detection results of the speed sensors S1, S2, S3, and S4 in engine startup control, and outputs the generated command.

3-1. L/U Clutch-Rotary Electric Machine Control Command Generation Section

FIG. 2 is a functional block diagram of the L/U clutch-rotary electric machine control command generation section 60.

The L/U clutch-rotary electric machine control command generation section 60 receives as input variables a rotational speed difference target value $\Delta N$, an actual turbine speed $N_T$, and a target driving force $T_{ATO}$. The rotational speed difference target value $\Delta N$ is the difference in rotational speed between the pump impeller 14a and the turbine runner 14b in the lock-up clutch 14z. The actual turbine speed $N_T$ is the rotational speed of the turbine runner 14b. The target driving force $T_{ATO}$ is a target torque to be transferred to the transmission device 15, and determined on the basis of the amount of operation of an accelerator performed by a driver and the vehicle speed. The target driving force $T_{ATO}$ may be determined on the basis of not only the accelerator operation amount and the vehicle speed but also other vehicle operating states such as the brake operation amount and the shift speed of the transmission device 15. The target driving force $T_{ATO}$ corresponds to the "target transmission device input torque" as used in the present application.

The L/U clutch-rotary electric machine control command generation section 60 outputs an engine-startup L/U torque capacity command $T_{L/UO}$ and an engine-startup rotary electric machine speed command (indicated as engine-startup motor speed command) $N_{MO}$. The engine-startup L/U torque capacity command $T_{L/UO}$ is a command to be sent to the L/U clutch operation control section 54. The engine-startup rotary electric machine speed command $N_{MO}$ is a command to be sent to the rotary electric machine operation control section 52.

As shown in FIG. 2, the L/U clutch-rotary electric machine control command generation section 60 includes a theoretical turbine torque calculation unit 60a. The theoretical turbine torque calculation unit 60a calculates a theoretical turbine torque $T_{TS}$ on the basis of the rotational speed difference target value $\Delta N$ and the actual turbine speed $N_T$ in accordance with the following [Formula 1].

$$T_{TS} = C \times (N_T + \Delta N)^2 \times Rt \qquad \text{[Formula 1]}$$

In the formula, C is a torque converter capacity coefficient. The torque converter capacity coefficient C is calculated from a relational map defining the relationship between a speed ratio Re (the ratio $N_T/N_P$ between the rotational speed $N_P$ of the pump impeller 14a and the rotational speed $N_T$ of the turbine runner 14b) and the torque converter capacity coefficient C shown in FIG. 4, for example. Rt is a torque converter torque ratio. The torque converter torque ratio Rt is calculated from a relational map defining the relationship between the speed ratio Re (the ratio $N_T/N_P$ between the rotational speed $N_P$ of the pump impeller 14a and the rotational speed $N_T$ of the turbine runner 14b) and the torque converter torque ratio Rt shown in FIG. 4, for example. It is a matter of course that these values may be calculated from a relational index, a relational formula, or the like.

The engine-startup L/U torque capacity command $T_{L/UO}$ is calculated by subtracting the theoretical turbine torque $T_{TS}$ from the target driving force $T_{ATO}$. The engine-startup L/U torque capacity command $T_{L/UO}$ is sent to an L/U torque capacity estimation unit 60b, which outputs a post-correction L/U torque capacity prediction value $T_{L/UE}'$, which is subtracted from the target driving force $T_{ATO}$ to derive a turbine torque command $T_{TO}$.

A rotary electric machine speed command calculation unit 60c generates the engine-startup rotary electric machine speed command $N_{MO}$ on the basis of the turbine torque command $T_{TO}$ in accordance with the following [Formula 2].

$$N_{MO} = (T_{TO}/(C \times Rt))^{1/2} \qquad \text{[Formula 2]}$$

This computation is convergent, and thus can be performed in advance using a map that uses the turbine torque command $T_{TO}$ and the actual turbine speed $N_T$ as arguments. The actual turbine speed $N_T$ corresponds to the "turbine speed of the turbine runner" as used in the present application.

Thus, the rotary electric machine speed command calculation unit 60c serves as the target rotational speed determination unit as used in the present application.

3-2. L/U Torque Capacity Estimation Unit

FIG. 3 is a functional block diagram of the L/U torque capacity estimation unit 60b.

The L/U torque capacity estimation unit 60b receives as input variables the engine-startup L/U torque capacity command $T_{L/UO}$, a motor torque command value $T_{MO}$, an actual motor speed $N_M$, and the actual turbine speed $N_T$.

The L/U torque capacity estimation unit 60b outputs the post-correction L/U torque capacity prediction value $T_{L/UE}'$ and an L/U torque capacity error E.

As is clear from the functional block diagram of FIG. 3, the functional block includes a prediction system for an engine-startup L/U torque capacity prediction value $T_{L/UE}$ shown in the upper part of the drawing, and an estimation system for an actual engine-startup L/U torque capacity estimation value (indicated as engine-startup L/U torque capacity actual estimation value) $T_{L/UR}$. In the embodiment, the post-correction L/U torque capacity prediction value $T_{L/UE}'$ is derived on the basis of the engine-startup L/U torque capacity prediction value $T_{L/UE}$ and the actual engine-startup L/U torque capacity estimation value $T_{L/UR}$.

Figure 5:
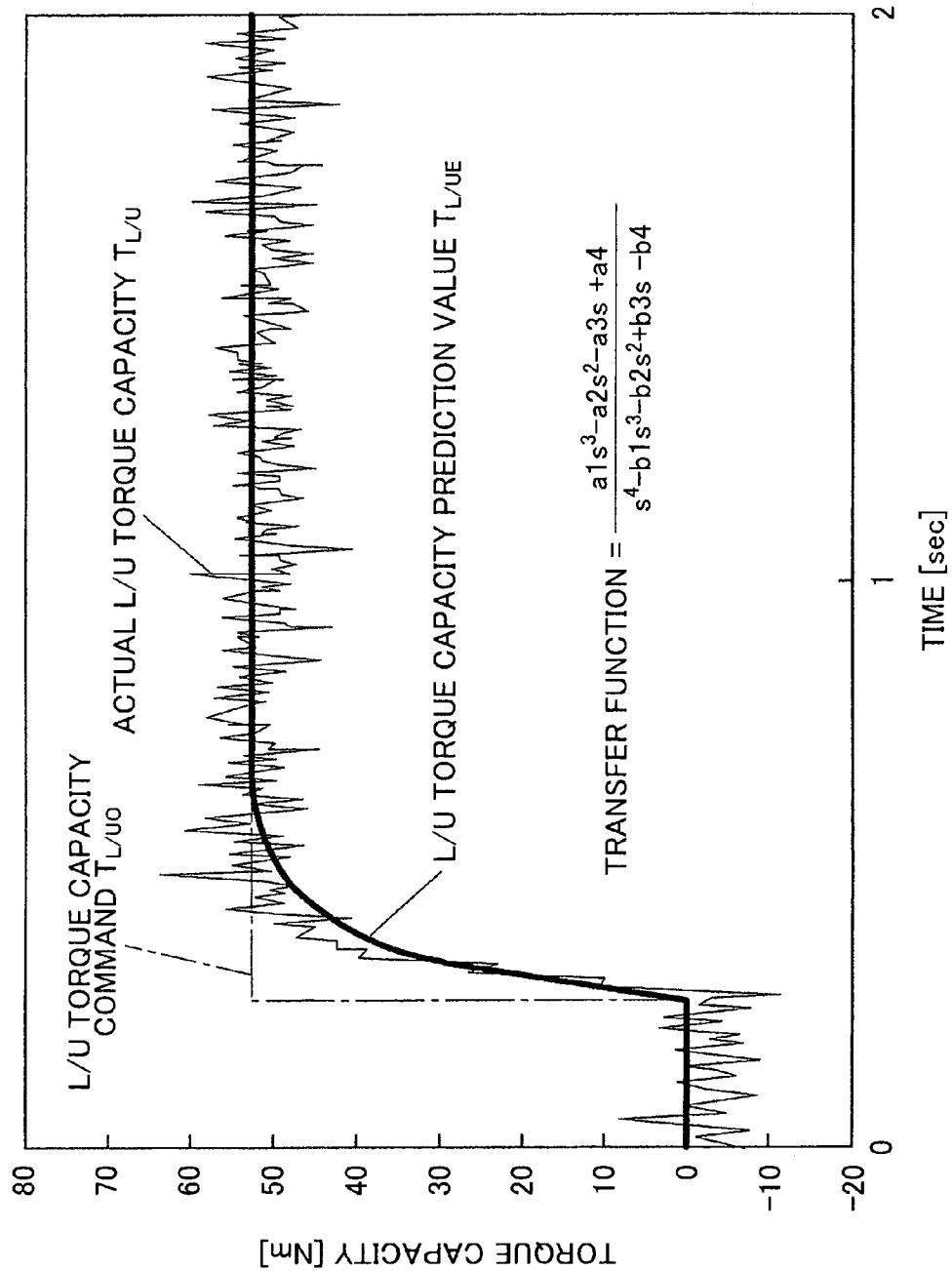
FIG. 5 shows an exemplary transfer function of a model including a control delay element provided in the L/U torque capacity prediction unit.

An L/U torque capacity prediction unit 60d is provided with a transfer function of the lock-up clutch, and calculates the engine-startup L/U torque capacity prediction value $T_{L/UE}$ on the basis of the engine-startup L/U torque capacity command $T_{L/UO}$. FIG. 5 shows the transfer function and the step response of the lock-up clutch 14z. In the transfer function, $a_1$ to $a_4$ and $b_1$ to $b_4$ are each a coefficient. As is seen, there is a control delay with respect to the L/U torque capacity command $T_{L/UO}$ which is a step input. The L/U torque capacity prediction value $T_{L/UE}$ and an actual L/U torque capacity $T_{L/U}$ are shown. The engine-startup L/U torque capacity command $T_{L/UO}$ and the engine-startup L/U torque capacity prediction value $T_{L/UE}$ correspond to the "target transfer torque command" and the "predicted transfer torque", respectively, as used in the present application.

An actual L/U torque capacity estimation unit 60e calculates the actual engine-startup L/U torque capacity estimation value $T_{L/UR}$ on the basis of the motor torque command value $T_{MO}$, the actual motor speed $N_M$, and a time differential $N_{MD}$ of the actual motor speed in accordance with the following [Formula 3].

$$T_{L/UR} = T_{MO} - N_M^2 \times C - J_M \times N_{MD} \quad \text{[Formula 3]}$$

In the formula, C is the torque converter capacity coefficient described earlier, and $J_M$ is the inertia of the motor. The engine-startup L/U torque capacity estimation value $T_{L/UR}$ corresponds to the "estimated actual transfer torque" as used in the present application.

Thus, the L/U torque capacity estimation unit 60b, the L/U torque capacity prediction unit 60d, and the actual L/U torque capacity estimation unit 60e respectively serve as the transfer torque estimation unit, the transfer torque prediction unit, and the actual transfer torque estimation unit as used in the present application.

In the embodiment, as shown in FIG. 3, the difference between the engine-startup L/U torque capacity prediction value $T_{L/UE}$ output from the L/U torque capacity prediction unit 60d and the actual engine-startup L/U torque capacity estimation value $T_{L/UR}$ output from the actual L/U torque capacity estimation unit 60e is further added to the engine-startup L/U torque capacity prediction value $T_{L/UE}$. Consequently, in the embodiment, the engine-startup L/U torque capacity estimation value $T_{L/UR}$ is used as it is as the post-correction L/U torque capacity prediction value $T_{L/UE}'$. In the example, the post-correction L/U torque capacity prediction value $T_{L/UE}'$ corresponds to the "estimated transfer torque".

Meanwhile, the difference between the engine-startup L/U torque capacity prediction value $T_{L/UE}$ and the actual engine-startup L/U torque capacity estimation value $T_{L/UR}$ is used as the L/U torque capacity error E for L/U torque capacity learning. The functional unit for deriving the L/U torque capacity error E serves as the transfer torque error derivation unit as used in the present application, and the L/U torque capacity error E corresponds to the "transfer torque error" as used in the present application.

The L/U torque capacity error E is reflected in estimation of the post-correction L/U torque capacity prediction value $T_{L/UE}'$ performed by the L/U torque capacity estimation unit 60b in a subsequent step such that the error E is eliminated. The unit for performing such reflection in the subsequent step serves as the transfer torque estimation learning unit as used in the present application.

4. Engine Startup Control

Engine startup control performed by the engine startup control unit 3 which has been described so far will be described below.

Two types of engine startup control are introduced herein. In first engine startup control, the motor 12 is controlled only through rotational speed control until the completion of engine startup. In second engine startup control, the motor 12 is controlled through rotational speed control in the initial stage of engine startup control, and through torque control thereafter.

Figure 6:
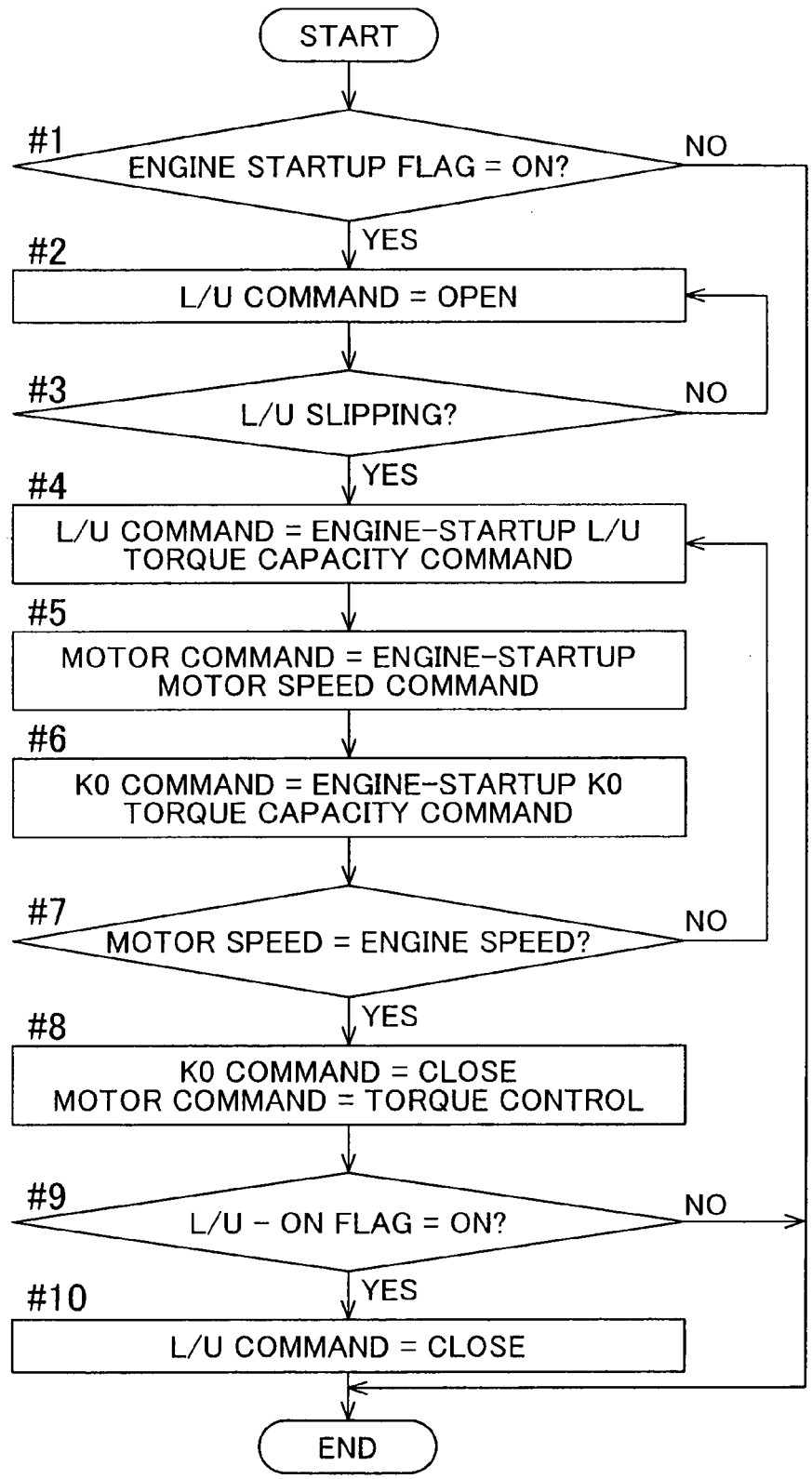
FIG. 6 shows a flow of engine startup control performed by the engine startup control device according to the present application.
Figure 7:
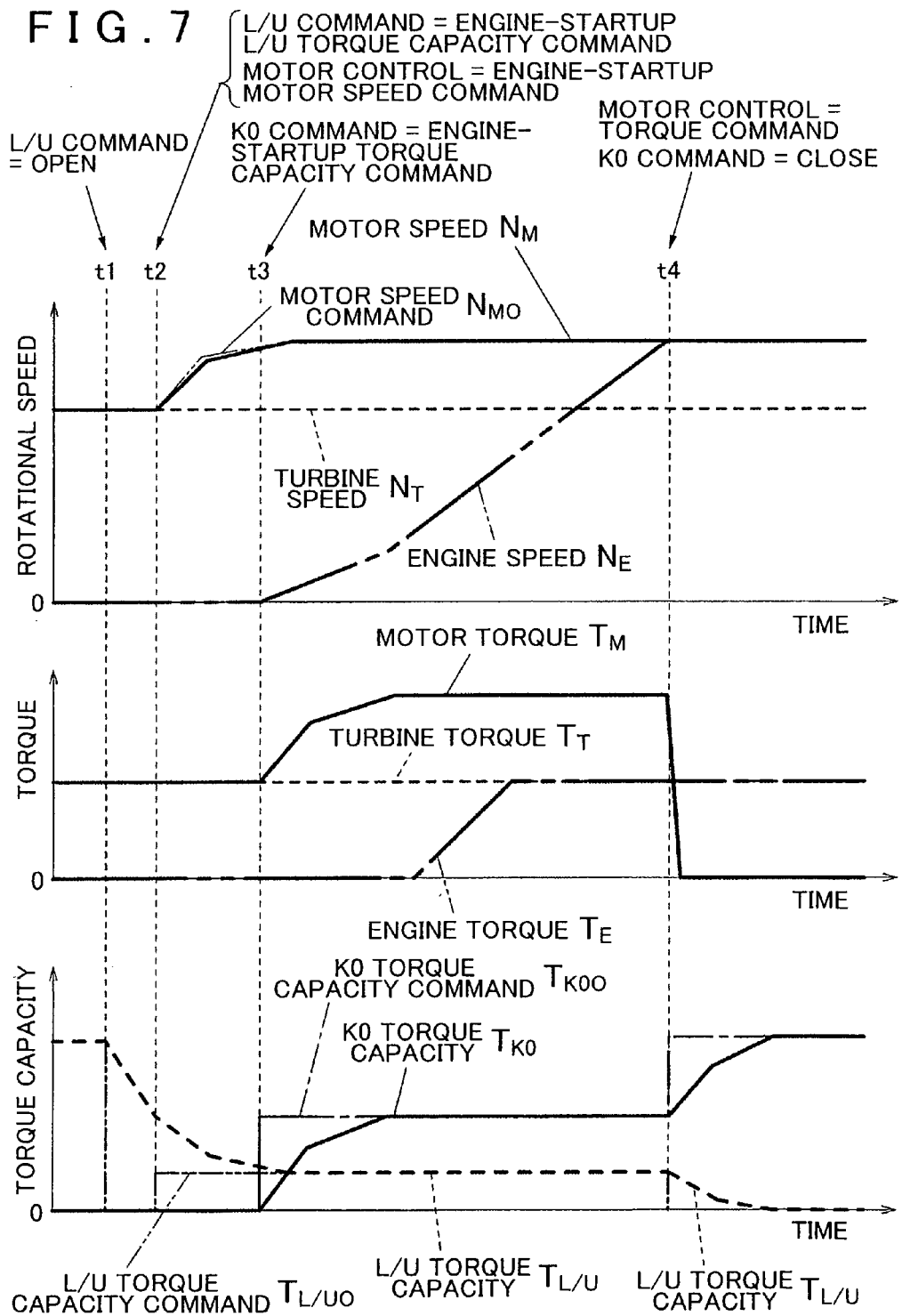
FIG. 7 is a time chart corresponding to the flow of the engine startup control shown in FIG. 6.

The flowchart shown in FIG. 6 and the time chart shown in FIG. 7 illustrate an example in which the motor 12 is controlled only through rotational speed control until the completion of engine startup.

Figure 8:
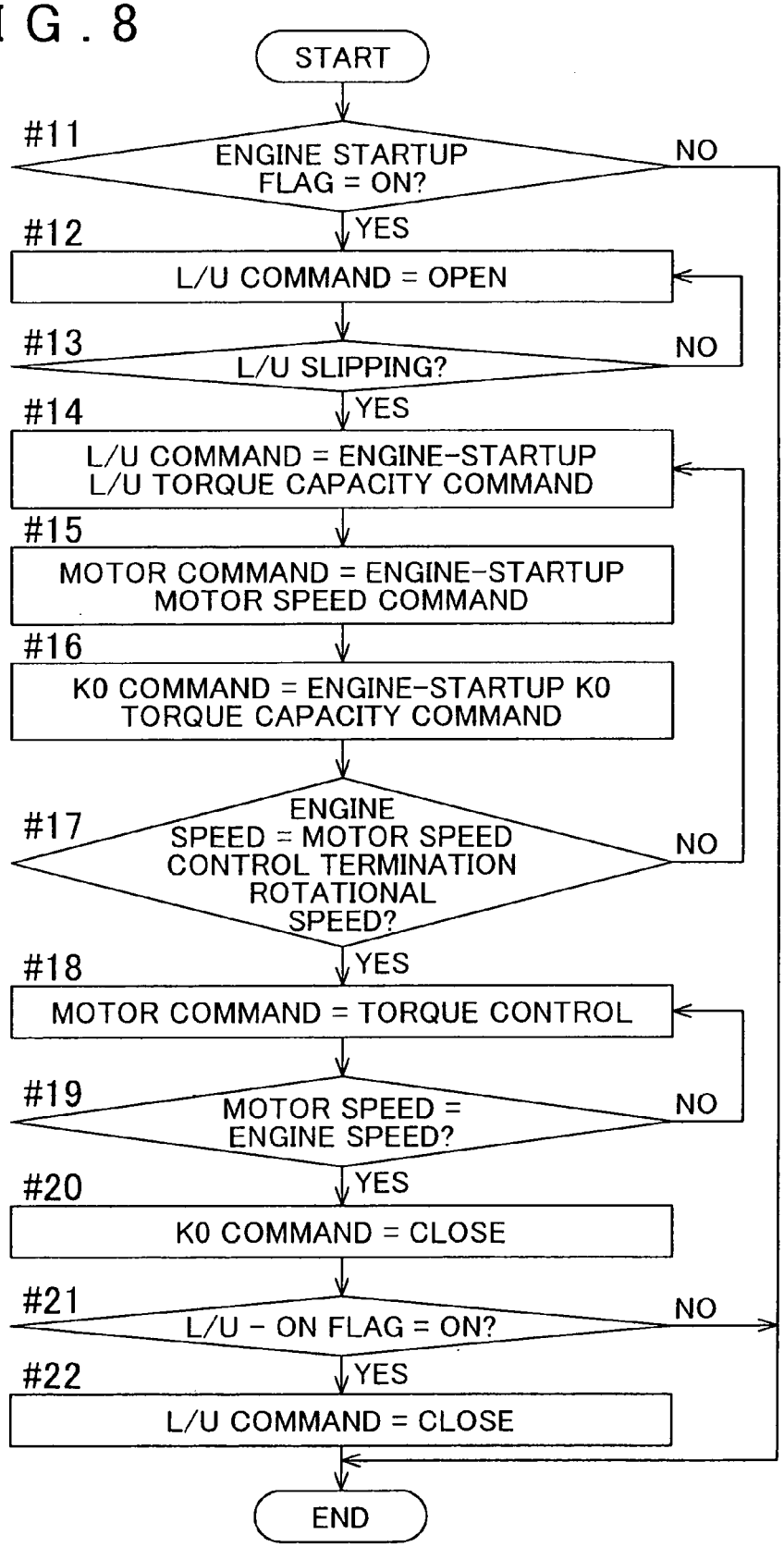
FIG. 8 shows another flow of the engine startup control performed by the engine startup control device according to the present application.
Figure 9:
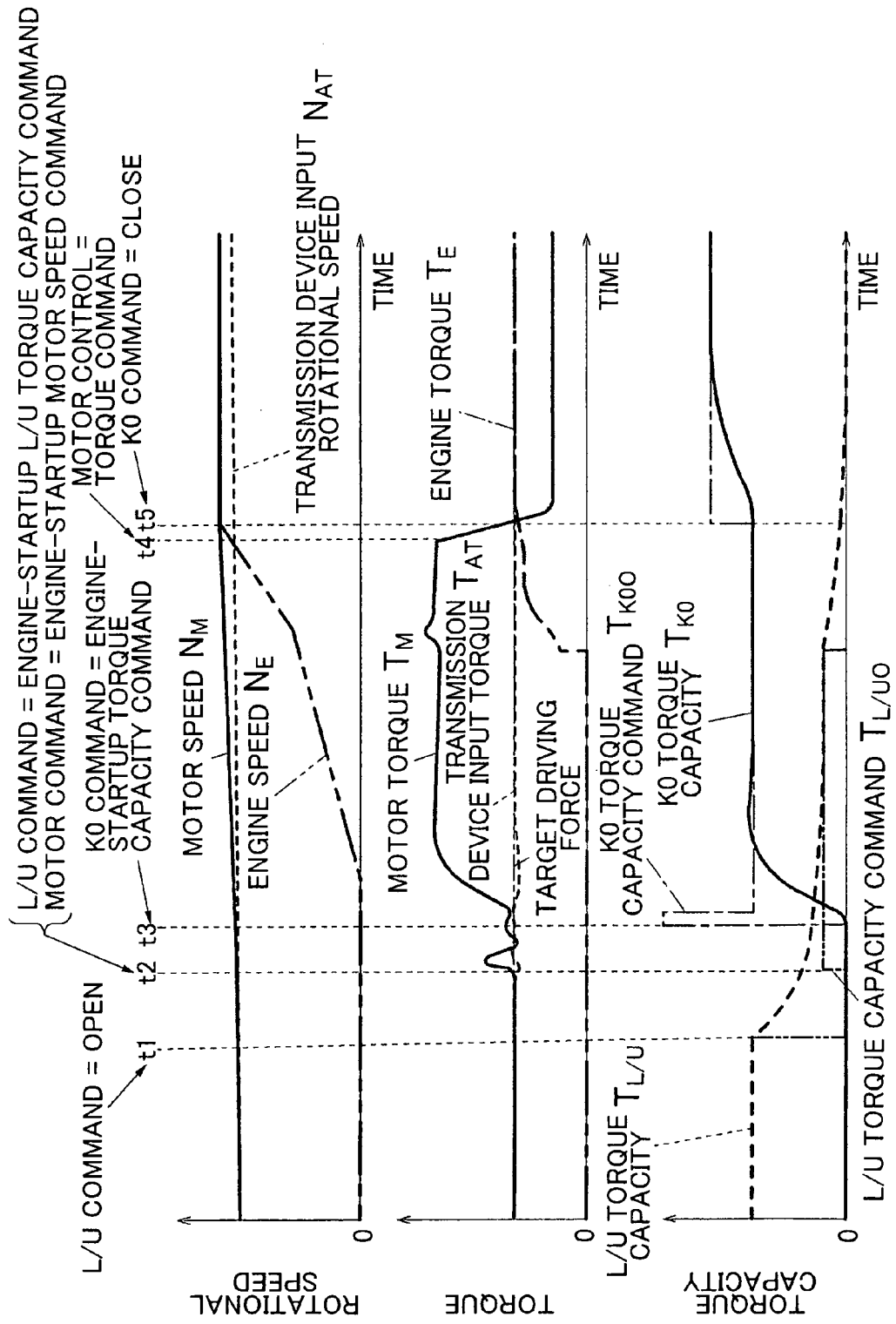
FIG. 9 is a time chart corresponding to the flow of the engine startup control shown in FIG. 8.

The flowchart shown in FIG. 8 and the time chart shown in FIG. 9 illustrate an example in which the motor 12 is controlled through rotational speed control in the initial stage of engine startup control and through torque control thereafter.

FIGS. 7 and 9 correspond to FIG. 11 which shows the related art described earlier, and show the behavior of each of the motor 12, the turbine (turbine runner 14b), the engine 11, and the K0 clutch 10. In the drawings, rotational speeds (motor speed $N_M$, motor speed command $N_{MO}$, turbine speed $N_T$, and engine speed $N_E$) are shown in the upper part, torques (motor torque $T_M$, turbine torque $T_T$, and engine torque $T_E$) are shown in the middle part, and torque capacity commands (K0 clutch torque capacity command $T_{K0O}$ and lock-up clutch capacity command $T_{L/UO}$) and actual torque capacities (K0 clutch torque capacity $T_{K0}$ and L/U clutch torque capacity $T_{L/U}$) are shown in the lower part.

In FIG. 7, timings indicated by t1 to t4 respectively indicate a timing t1 to open the lock-up control command, a timing t2 to start lock-up control and motor speed control, a timing t3 to start K0 clutch control, and a timing t4 to start motor torque control and stop K0 clutch control.

In FIG. 9, timings indicated by t1 to t5 respectively indicate a timing t1 to open the lock-up control command, a timing t2 to start lock-up control and motor speed control, a timing t3 to start K0 clutch control, and a timing t4 to start motor torque control, and a timing t5 to stop K0 clutch control.

The two types of engine startup control will be described below in order.

4.1 Engine Startup only through Rotational Speed Control

In the case of starting up the engine 11 again from an EV running state, an engine startup flag is turned on (step #1: Yes) to start the subsequent processes.

Timing t1 to Open Lock-Up Control Command

An L/U command starts being output to the L/U clutch operation control section 54 (step #2). In this state, it is determined whether or not the lock-up clutch 14z is slipping by the rotational speed difference $\Delta N$ (step #3). If not, the process waits until such slipping occurs (step #3: No).

Timing t2 to Start Lock-Up Control and Motor Speed Control

If it is determined that such slipping is occurring (step #3: Yes), the L/U command is set as the engine-startup L/U torque capacity command $T_{L/UO}$ described earlier (step #4), and the motor command is set as the engine-startup motor speed command $N_{MO}$ (step #5). At this timing, control based on L/U torque capacity estimation according to the present application described earlier is executed.

Timing t3 to Start K0 Clutch Control

When the motor speed reaches a predetermined rotational speed, the K0 command is set as the engine-startup K0 torque capacity command, and the command is sent to the K0 clutch operation control section 50 (step #6). At this timing, a startup torque is transferred from the motor 12 to the engine 11.

The rotational speed of the motor 12 and the rotational speed of the engine 11 are compared sequentially during execution of engine startup, and it is determined whether or not the engine speed has reached the motor speed (step #7). If not, the process waits until the engine speed reaches the motor speed (step #7: No).

Timing t4 to Start Motor Torque Control and Stop K0 Clutch Control

When the engine speed reaches the motor speed (step #7: Yes), K0 clutch control is stopped and motor torque control is started (step #8).

Thereafter, an L/U-ON flag is checked (step #9). If the flag is on (step #9: Yes), the L/U command is closed (step #10). If the flag is off (step #9: No), no such step is taken, and the engine startup control is then terminated.

Comparing the results in FIGS. 7 and 11, it is found that the peak in turbine torque which appeared after the timing t1 to open the lock-up control command in the related art has disappeared through execution of the engine startup control according to the present application.

4-2. Engine Startup through Rotational Speed Control and Torque Control

In the case of starting up the engine again from an EV running state, an engine startup flag is turned on (step #11: Yes) to start the subsequent processes.

Timing t1 to Open Lock-Up Control Command

An L/U command starts being output to the L/U clutch operation control section 54 (step #12). In this state, it is determined whether or not the lock-up clutch 14z is slipping by the rotational speed difference ΔN (step #13). If not, the process waits until such slipping occurs (step #13: No).

Timing t2 to Start Lock-Up Control and Motor Speed Control

If it is determined that such slipping is occurring (step #13: Yes), the L/U command is set as the engine-startup L/U torque capacity command $T_{L/UO}$ described earlier (step #14), and the motor command is set as the engine-startup motor speed command $N_{MO}$ (step #15). At this timing, control based on L/U torque capacity estimation according to the present application described earlier is executed.

Timing t3 to Start K0 Clutch Control

When the rotational speed of the motor 12 reaches a predetermined rotational speed, the K0 command is set as the engine-startup K0 torque capacity command, and the command is sent to the K0 clutch operation control section 50 (step #16). At this timing, a startup torque is transferred from the motor 12 to the engine 11.

The rotational speed of the engine 11 and a preset motor speed control termination rotational speed are compared sequentially during execution of engine startup, and it is determined whether or not the engine speed has reached the motor speed control termination rotational speed (step #17). If not, the process waits until the engine speed reaches the motor speed (step #17: No).

Timing t4 to Start Motor Torque Control

When the engine speed reaches the motor speed control termination rotational speed (step #17: Yes), motor torque control is started (step #18).

Further, the rotational speed of the motor 12 and the rotational speed of the engine 11 are compared, and it is determined whether or not the engine speed has reached the motor speed (step #19). If not, the process waits until the engine speed reaches the motor speed (step #19: No).

Timing t5 to Stop K0 Clutch Control

When the engine speed reaches the motor speed (step #19: Yes), K0 clutch control is stopped (step #20).

Thereafter, an L/U-ON flag is checked (step #21). If the flag is on (step #21: Yes), the L/U command is closed (step #22). If the flag is off (step #21: No), no such step is taken, and the engine startup control is then terminated.

Comparing FIGS. 9 and 11, it is found that the peak in turbine torque which appeared after the timing t1 to open the lock-up control command in the related art has disappeared through execution of the engine startup control according to the present application.

Other Embodiments (1) In the embodiment described above, in estimating the post-correction L/U torque capacity prediction value $T_{L/UE}'$ on the basis of the engine-startup L/U torque capacity prediction value $T_{L/UE}$ and the actual engine-startup L/U torque capacity estimation value $T_{L/UR}$, the engine-startup L/U torque capacity estimation value $T_{L/UR}$ estimated by the actual L/U torque capacity estimation unit 60e is eventually used as it is as the post-correction L/U torque capacity prediction value $T_{L/UE}'$. However, the post-correction L/U torque capacity prediction value $T_{L/UE}'$ may be calculated with weighting the actual engine-startup L/U torque capacity estimation value $T_{L/UR}$ and the engine-startup L/U torque capacity prediction value $T_{L/UE}$ predicted by the L/U torque capacity prediction unit 60d. The L/U torque capacity prediction unit 60d may not necessarily be provided so that the post-correction L/U torque capacity prediction value $T_{L/UE}'$ is obtained only on the basis of the actual engine-startup L/U torque capacity estimation value $T_{L/UR}$, using the engine-startup L/U torque capacity estimation value $T_{L/UR}$ as it is as the post-correction L/U torque capacity prediction value $T_{L/UE}'$. Alternatively, the actual L/U torque capacity estimation unit 60e may not necessarily be provided so that the post-correction L/U torque capacity prediction value $T_{L/UE}'$ is obtained only on the basis of the engine-startup L/U torque capacity prediction value $T_{L/UE}$, using the engine-startup L/U torque capacity prediction value $T_{L/UE}$ as it is as the post-correction L/U torque capacity prediction value $T_{L/UE}'$.

(2) In the embodiment described above, the torque converter capacity coefficient C is obtained on the basis of the map shown in FIG. 4 or the like. However, the torque converter capacity coefficient may be obtained on the basis of the relationship between the output torque and the rotational speed of the rotary electric machine 12 in an EV running state in which the driving force produced by the rotary electric machine 12 is transferred to the transmission device 15 via the torque converter 14 with both the transfer clutch 10 and the lock-up clutch 14z disengaged. The torque converter capacity coefficient C is defined as $T_P/N_P^2$, where $T_P$ and $N_P$ are the torque and the rotational speed, respectively, of the pump impeller 14b, which correspond to the output torque and the rotational speed, respectively, of the rotary electric machine 12. Therefore, it is possible to adapt well to secular changes of the torque converter 14 by obtaining the torque converter capacity coefficient C on the basis of the output torque and the rotational speed of the rotary electric machine 12 which have been calculated in an EV running state.

A unit for calculating the torque converter capacity coefficient C on the basis of the relationship between the output torque and the rotational speed of the rotary electric machine 12 is referred to as capacity coefficient derivation unit.

It is possible to adapt well to such secular changes by providing capacity coefficient learning unit for allowing the capacity coefficient C calculated by the capacity coefficient derivation unit to be reflected in transfer torque estimation subsequently performed by the transfer torque estimation unit.

(3) In the embodiment described above, the lock-up clutch 14z is provided in the torque converter 14. However, a fluid coupling may be used in place of a torque converter for transfer of motive power between the rotary electric machine 12 and the transmission device 15 in the present application. Thus, in the present application, the torque converter and the fluid coupling are collectively referred to as a "fluid power transmission device".

In a technology of allowing an engine to be started by a driving force of a rotary electric machine in an EV running state, a hybrid drive device has been obtained in which a torque in accordance with a target torque can be sufficiently transferred to a transmission device.

What is claimed is:

1. A hybrid drive device comprising:
  a rotary electric machine coupled to an engine via a transfer clutch;
  a fluid power transmission device including a lock-up clutch and having a pump impeller and a turbine runner;
  a transmission device coupled to the rotary electric machine via the fluid power transmission device to receive a driving force produced by one or both of the engine and the rotary electric machine each serving as a driving force source and to output the received driving force after changing a speed thereof;
  an engine startup control device that starts up the engine, from a state in which the driving force is transferred from the rotary electric machine to the transmission device with the engine stationary and with the lock-up clutch engaged, by executing rotational speed control to bring a rotational speed of the rotary electric machine to a target rotational speed with the lock-up clutch slipping, and engaging the transfer clutch;
  a transfer torque estimation unit for estimating a transfer torque transferred by the lock-up clutch with the lock-up clutch slipping; and
  a target rotational speed determination unit for determining the target rotational speed of the rotary electric machine to be achieved in the rotational speed control on the basis of the transfer torque estimated by the transfer torque estimation unit, a target transmission device input torque of the transmission device determined on the basis of an operating state of a vehicle, and a turbine speed of the turbine runner, wherein
  the engine startup control device starts up the engine by controlling the rotational speed of the rotary electric machine to the target rotational speed determined by the target rotational speed determination unit, and
  the transfer torque estimation unit includes a transfer torque prediction unit including a control delay element for outputting a predicted transfer torque with a control response delay with respect to a target transfer torque command provided to the lock-up clutch, and estimates the transfer torque on the basis of the predicted transfer torque output from the transfer torque prediction unit.

2. The hybrid drive device according to claim 1, wherein the transfer torque estimation unit estimates the transfer torque on the basis of a predicted transfer torque which is a response with a control response delay to a target transfer torque command provided to the lock-up clutch, and an estimated actual transfer torque estimated to be actually transferred by the lock-up clutch.

3. The hybrid drive device according to claim 2, wherein the transfer torque estimation unit includes an actual transfer torque estimation unit for calculating a capacity coefficient C of the fluid power transmission device on the basis of a speed ratio Re which is a ratio $N_T/N_P$ between the turbine speed $N_T$ of the turbine runner and a pump speed $N_P$ of the pump impeller, and computing the estimated actual transfer torque on the basis of a rotary electric machine torque command $T_{MO}$ for the rotary electric machine, the rotational speed $N_M$ of the rotary electric machine, the capacity coefficient C, and an inertia $J_M$ of the rotary electric machine, and
  the transfer torque estimation unit estimates the transfer torque to be the estimated actual transfer torque computed by the actual transfer torque estimation unit on the basis of the rotary electric machine torque command $T_{MO}$, the actual rotational speed $N_M$ of the rotary electric machine, the capacity coefficient C, and the inertia $J_M$ of the rotary electric machine.

4. The hybrid drive device according to claim 3, wherein wherein the actual transfer torque estimation unit computes the estimated actual transfer torque $T_{L/UR}$ on the basis of the rotary electric machine torque command $T_{MO}$ for the rotary electric machine, the actual rotational speed $N_M$ of the rotary electric machine, a time differential $N_{MD}$ of the actual rotational speed of the rotary electric machine, the capacity coefficient C, and the inertia $J_M$ of the rotary electric machine using a formula $T_{L/UR}=T_{MO}-N_M^2 \times C-J_M \times N_{MD}$.

5. The hybrid drive device according to claim 4, further comprising:
  a capacity coefficient derivation unit for calculating a capacity coefficient of the fluid power transmission device on the basis of relationship between an output torque and the rotational speed of the rotary electric machine in an EV running state in which a driving force produced by the rotary electric machine is transferred to the transmission device via the fluid power transmission device with both the transfer clutch and the lock-up clutch disengaged; and
  a capacity coefficient learning unit for allowing the capacity coefficient calculated by the capacity coefficient derivation unit to be reflected in transfer torque estimation subsequently performed by the transfer torque estimation unit.

6. The hybrid drive device according to claim 5, further comprising:
  a transfer torque error derivation unit for calculating a transfer torque error which is a difference between the estimated actual transfer torque and the predicted transfer torque; and
  a transfer torque estimation learning unit for allowing the transfer torque error derived by the transfer torque error derivation unit to be reflected in transfer torque estimation subsequently performed by the transfer torque estimation unit.

7. The hybrid drive device according to claim 6, further comprising:

a capacity coefficient derivation unit for calculating a capacity coefficient of the fluid power transmission device on the basis of relationship between an output torque and the rotational speed of the rotary electric machine in an EV running state in which a driving force produced by the rotary electric machine is transferred to the transmission device via the fluid power transmission device with both the transfer clutch and the lock-up clutch disengaged; and a capacity coefficient learning unit for allowing the capacity coefficient calculated by the capacity coefficient derivation unit to be reflected in transfer torque estimation subsequently performed by the transfer torque estimation unit.

8. The hybrid drive device according to claim 2, wherein the transfer torque estimation unit includes:

a transfer torque prediction unit including a control delay element for outputting a predicted transfer torque which is a response with a control response delay to a target transfer torque command provided to the lock-up clutch; and an actual transfer torque estimation unit for calculating a capacity coefficient C of the fluid power transmission device on the basis of a speed ratio Re which is a ratio $N_T/N_P$ between the turbine speed $N_T$ of the turbine runner and a pump speed $N_P$, and computing the estimated actual transfer torque on the basis of a rotary electric machine torque command $T_{MO}$ for the rotary electric machine, the rotational speed $N_M$ of the rotary electric machine, the capacity coefficient C, and an inertia $J_M$ of the rotary electric machine, and the transfer torque estimation unit estimates the transfer torque on the basis of the predicted transfer torque output from the transfer torque prediction unit in response to an actual target transfer torque command, and the estimated actual transfer torque computed by the actual transfer torque estimation unit on the basis of an actual rotary electric machine torque command $T_{MO}$, the actual rotational speed $N_M$ of the rotary electric machine, the capacity coefficient C, and an inertia $J_M$ of the rotary electric machine.

9. The hybrid drive device according to claim 1, wherein the transfer torque estimation unit includes an actual transfer torque estimation unit for calculating a capacity coefficient C of the fluid power transmission device on the basis of a speed ratio Re which is a ratio $N_T/N_P$ between the turbine speed $N_T$ of the turbine runner and a pump speed $N_P$ of the pump impeller, and computing the estimated actual transfer torque on the basis of a rotary electric machine torque command $T_{MO}$ for the rotary electric machine, the rotational speed $N_M$ of the rotary electric machine, the capacity coefficient C, and an inertia $J_M$ of the rotary electric machine, and the transfer torque estimation unit estimates the transfer torque to be the estimated actual transfer torque computed by the actual transfer torque estimation unit on the basis of the rotary electric machine torque command $T_{MO}$, the actual rotational speed $N_M$ of the rotary electric machine, the capacity coefficient C, and the inertia $J_M$ of the rotary electric machine.

10. The hybrid drive device according to claim 9, wherein wherein the actual transfer torque estimation unit computes the estimated actual transfer torque $T_{L/UR}$ on the basis of the rotary electric machine torque command $T_{MO}$ for the rotary electric machine, the actual rotational speed $N_M$ of the rotary electric machine, a time differential $N_{MD}$ of the actual rotational speed of the rotary electric machine, the capacity coefficient C, and the inertia $J_M$ of the rotary electric machine using a formula $T_{L/UR} = T_{MO} - N_M^2 \times C - J_M \times N_{MD}$.

11. The hybrid drive device according to claim 10, further comprising:

a capacity coefficient derivation unit for calculating a capacity coefficient of the fluid power transmission device on the basis of relationship between an output torque and the rotational speed of the rotary electric machine in an EV running state in which a driving force produced by the rotary electric machine is transferred to the transmission device via the fluid power transmission device with both the transfer clutch and the lock-up clutch disengaged; and a capacity coefficient learning unit for allowing the capacity coefficient calculated by the capacity coefficient derivation unit to be reflected in transfer torque estimation subsequently performed by the transfer torque estimation unit.

* * * * *